United States Patent [19]

Aoustin et al.

[11] Patent Number: 4,568,461
[45] Date of Patent: Feb. 4, 1986

[54] APPARATUS FOR DISTRIBUTING A SUBSTANCE OVER A SURFACE

[75] Inventors: Jean Aoustin, Rouen; Guy Nineuil, Bihorel; Bernard Wallon, Mont-Saint-Aignan, all of France

[73] Assignee: Rhone-Poulenc Chimie De Base, Courbevoie, France

[21] Appl. No.: 588,909

[22] Filed: Mar. 12, 1984

[30] Foreign Application Priority Data

Mar. 14, 1983 [FR] France ............................... 83 04119

[51] Int. Cl.⁴ ............................................. B01D 33/38
[52] U.S. Cl. ..................................... 210/456; 210/519; 209/254
[58] Field of Search ............... 210/248, 405, 456, 519, 210/520, 541, 542, 921, 420, 421, 418, 419, 780, 393, 401, 320, 305; 209/244, 245, 254

[56] References Cited

U.S. PATENT DOCUMENTS

| | | | |
|---|---|---|---|
| 2,039,573 | 5/1936 | Weber | 210/456 |
| 3,426,908 | 2/1969 | Davis et al. | 210/401 |
| 3,540,596 | 11/1970 | Bugbee et al. | 210/405 |
| 3,626,486 | 12/1971 | Bugbee et al. | 210/405 |
| 3,988,243 | 10/1976 | Huff | 210/456 |
| 4,053,407 | 10/1977 | Nordengren | 210/456 |
| 4,230,575 | 10/1980 | Lizee | 210/456 |
| 4,366,058 | 12/1982 | Wolde-Michael | 210/456 |
| 4,376,052 | 3/1983 | Gessler | 210/456 |
| 4,422,931 | 12/1983 | Wolde-Michael | 210/221.2 |
| 4,469,556 | 9/1984 | Sanford | 210/456 |

*Primary Examiner*—John Adee
*Assistant Examiner*—Wanda L. Millard
*Attorney, Agent, or Firm*—Burns, Doane, Swecker & Mathis

[57] ABSTRACT

An apparatus for distributing a substance over a surface includes a feed compartment which is provided with substance feed means and which is defined by a bottom, a rear wall, two side walls and a front wall forming an overflow. A distribution compartment has a rear wall defined by the overflow, two side walls, a front wall, a bottom and an opening for the substance to flow out. The feed compartment is provided with baffle members to ensure distribution of the substance therein.

15 Claims, 5 Drawing Figures

APPARATUS FOR DISTRIBUTING A SUBSTANCE OVER A SURFACE

BACKGROUND OF THE INVENTION

The present invention relates to an apparatus for distributing a material over a surface.

The invention is concerned in particular with distributing a slurry to be filtered over a filtering surface, and specifically to the production of phosphoric acid, where it can be used to distribute a wash liquid, or any liquid which is more or less highly charged with solid matter, over a filter.

An apparatus of this type is disclosed, for example, in U.S. Pat. No. 4,230,575. That apparatus is formed by a body or casing which comprises a feed compartment into which a material to be filtered is introduced, and a distribution compartment into which the material passes by overflow from the feed compartment, flowing out of the distribution compartment over the filtering surface.

At the present time, the installations being built to filter slurries are of ever-increasing size, in order to produce ever-increasing tonnages. This occurrence gives rise to the necessity for higher flow rates of material to be introduced in each operation into the casings of the above-specified type. It has been noted that, with high flow rates, the major part of the slurry has a tendency to be displaced towards the side edges of the feed and distribution compartments, which give rise to unequal distribution over the filter surface.

OBJECT AND SUMMARY OF THE INVENTION

The present invention is therefore concerned with an improvement which permits homogenous distribution of the material to be filtered under all circumstances and in particular with high flow rates, without concomitantly increasing the dimensions or volume of the existing apparatus. In fact, an increase in dimensions is undesired since it increases the costs of manufacture of the apparatus and also reduces the feasibility of moving it.

For this purpose, an apparatus constructed according to the present invention includes a feed compartment that is provided with means for feeding the material. This compartment is defined by a bottom wall, a rear wall, two side walls and a front wall forming an overflow. The distribution compartment has a rear wall defined by said overflow, two side walls, a front wall, a bottom and an opening permitting the material to flow out over the filter surface. This apparatus is characterized by a feed compartment that is provided with baffle members.

The present invention will be better appreciated and other features, details and advantages thereof will be more clearly apparent from the following description, made with reference to the accompanying diagrammatic drawings of exemplary embodiments of the invention.

DESCRIPTION OF THE ILLUSTRATED EMBODIMENTS

Figure 1:
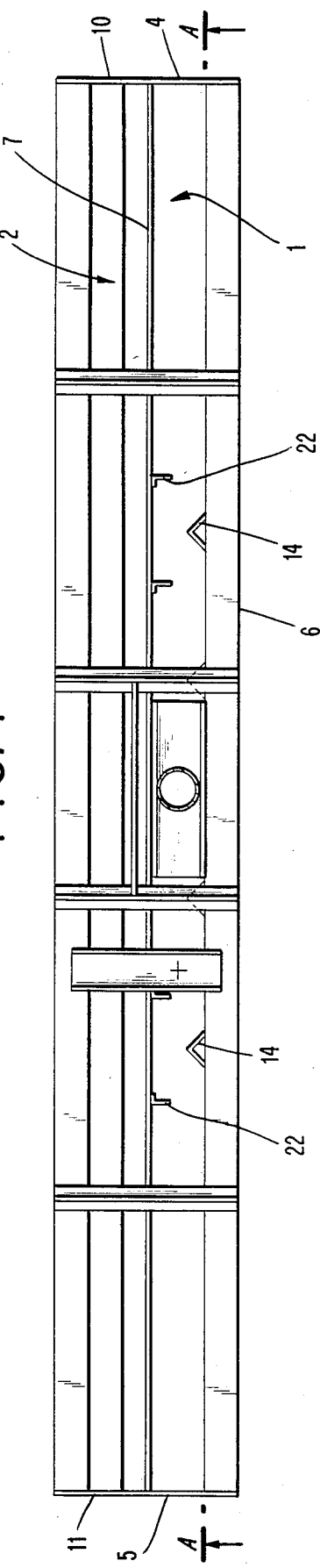
FIG. 1 is a plan view of a distribution apparatus according to the invention.
Figure 3:
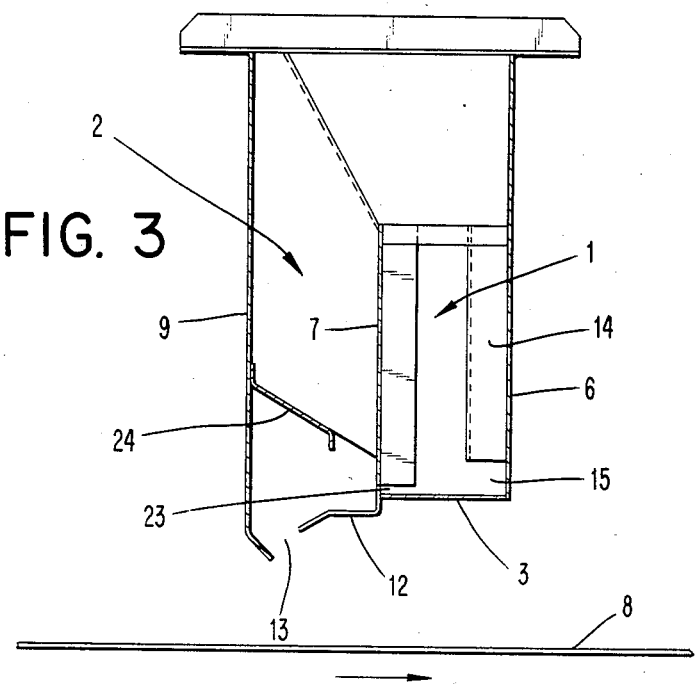
FIG. 3 is a view in cross-section taken along line BB in FIG. 2.

Referring to FIGS. 1 and 3, an apparatus for distributing a material to a rotary circular filter comprises a feed compartment 1 and a distribution compartment 2. The feed compartment 1 is defined by a bottom 3, two side walls 4 and 5, a rear wall 6 and a front wall 7. The terms front and rear herein are defined with respect to the relative direction of movement of the filtering surface 8, as indicated in FIG. 3. Means for introducing the material to be filtered into the feed compartment are provided and positioned, in particular in the illustrated embodiment, in such a way as to introduce that substance into the central part of the compartment.

The distribution compartment 2 is formed by a front wall 9, two side walls 10 and 11, a bottom 12 and a rear wall which in fact is formed by the wall 7 of the feed compartment. This wall which is common to the two compartments acts as an overflow means. Moreover, the distribution compartment is provided with an opening 13 which permits the slurry to flow out over the filtering surface 8. In the illustrated construction, the opening 13 is provided in the bottom 12.

Figure 2:
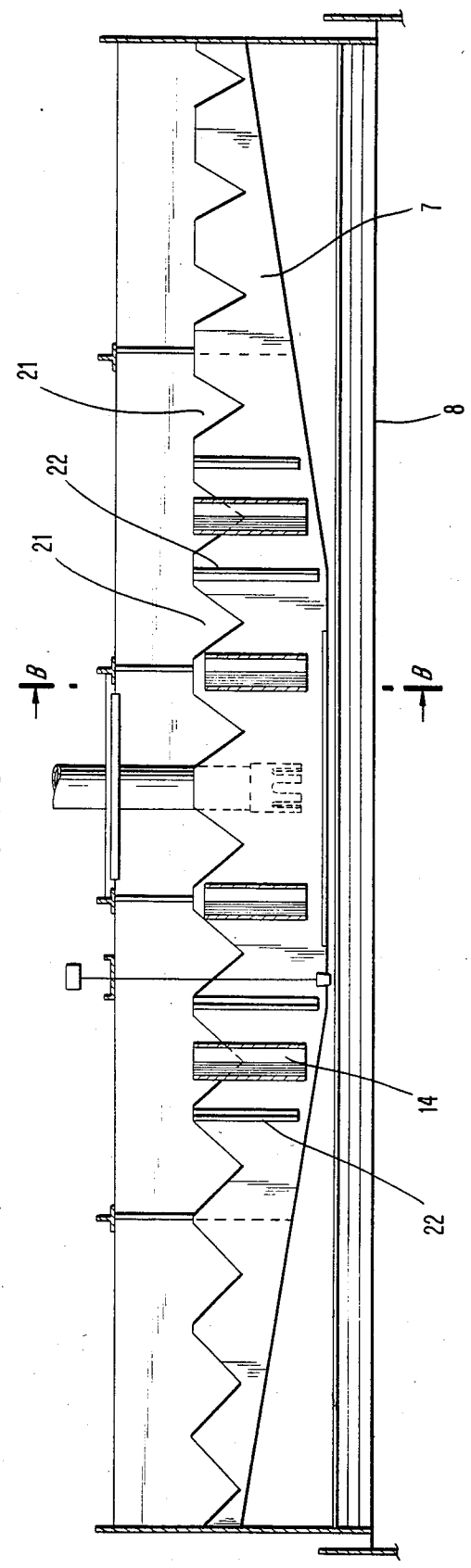
FIG. 2 is a view in cross-section taken along line AA in FIG. 1.

As shown in FIG. 2, the bottom 3 of the feed compartment can advantageously comprise a flat portion in the central part of the apparatus, and two inclined surface portions that are directed upwardly from said first portion towards each of the side walls 4 and 5 of the feed compartment.

In accordance with the invention, the feed compartment is provided with baffle members to provide a more even distribution of the slurry in the feed compartment, and consequently also in the distribution compartment and over the filter surface. The baffle members can be fixed to at least one of the front and rear walls of the feed compartment and they can comprise angle members 14.

In the illustrated embodiment, the angle members 14 are fixed by means of the limb portions thereof to the rear wall 6 of the compartment 1.

It will be appreciated that any number of such baffle members can be provided. Preferably, the baffle members are positioned in the vicinity of the location at which the slurry is introduced into the compartment.

The baffle members 14 can be disposed so as to extend vertically, and substantially over the entire distance from the bottom 3 of the compartment to the upper end of the overflow 7. However, with one or more of the baffle members, it is preferable to provide a spacing 15 between their lower ends and the bottom 3. It is also possible to render the baffle members adjustable in height, thereby making it possible to vary the above-mentioned spacing in dependence on the flow rate and the point of introduction of the slurry into the compartment 1.

For this purpose, in a particular embodiment of the invention herein the baffle members are formed by angle members, at least one angle member is engaged into or receives a second angle member, the angle members including means for fixing them and for adjustment in height of one relative to the other. This embodiment is more clearly illustrated in FIG. 4.

Figure 4:
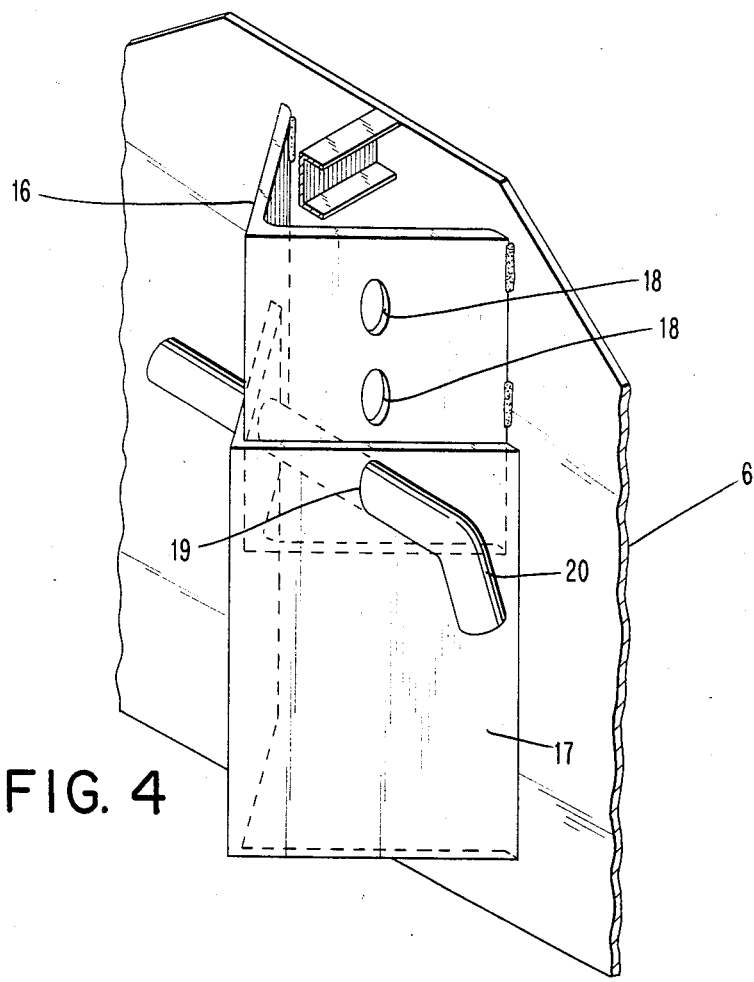
FIG. 4 is a diagrammatic view showing a particular embodiment of the baffle members.

Referring to FIG. 4, an internal angle member 16 is welded by means of its two limb portions to the rear wall 6. An external angle member 17 is fitted onto the angle member 16. So as to permit the two angle members to be adjusted in height and fixed in position, the limb portions of the angle member 16 each have a series of openings 18 therethrough. Likewise, the limb portions of the angle member 17 each comprise an opening 19. A pin 20 which passes through the above-mentioned openings permits the movable external angle member 17 to be fixed with respect to the fixed internal angle member 16. This arrangement makes it possibly to easily adjust the spacing between the bottom of the feed compartment and the lower end of the movable angle member 17.

In accordance with an alternative embodiment of the invention, the overflow 7 may be provided, more particularly at its upper edge portion, with overflow orifices for the substance to be filtered. The overflow orifices make it possible to perfect complete distribution of the flow of the slurry through the overflow. As shown in FIG. 2, the orifices 21 may be of a triangular configuration, the apex of which is directed downwardly or towards the bottom of the apparatus, while the base of the triangle coincides with the upper overflow 7.

U.S. Pat. No. 4,230,575 discloses orifices of this type in the situation in which the apparatus is used with a rotary circular filter. In this application, the orifices have areas that are different from each other and are so calculated that the flow passing therethrough is proportional to the portion of filtering surface onto which it will flow. It will be appreciated that such an arrangement of the orifices can advantageously be used in the context of the present invention.

As can be seen from FIGS. 1, 2 and 3, deflectors 22 can be provided in the feed compartment, these deflectors 22 being fixed to the wall 7 forming the overflow means in the vicinity of the orifices 21, that is to say, on that part of the wall 7 which follows the orifice looking in a direction from the point of introduction of the slurry towards the side walls. The deflectors 22 can be formed by flat members or bars which extend substantially over the full height of the wall forming the overflow means. However, a spacing 23 is preferably provided between the lower end of the deflector and the bottom 3.

As will be seen from FIGS. 1 to 3, the deflectors can advantageously be oriented perpendicular to the wall 7. In addition, they can extend along the wall for a distance which is greater than the height of the orifices and, for example, in the illustrated embodiment, they extend downwardly beyond the apex of the triangle forming the orifice.

In addition, in accordance with another alternative form of the invention, the distribution compartment can be provided with a plate forming a screen, which is fixed with respect to one of the front rear walls of the compartment and which is disposed above the discharge flow opening thereof. The screens extends over the entire length of the compartment and is preferably inclined towards the bottom thereof. FIG. 3 shows such a screen 24 which is fixed to the front wall 9 of the compartment.

Figure 5:
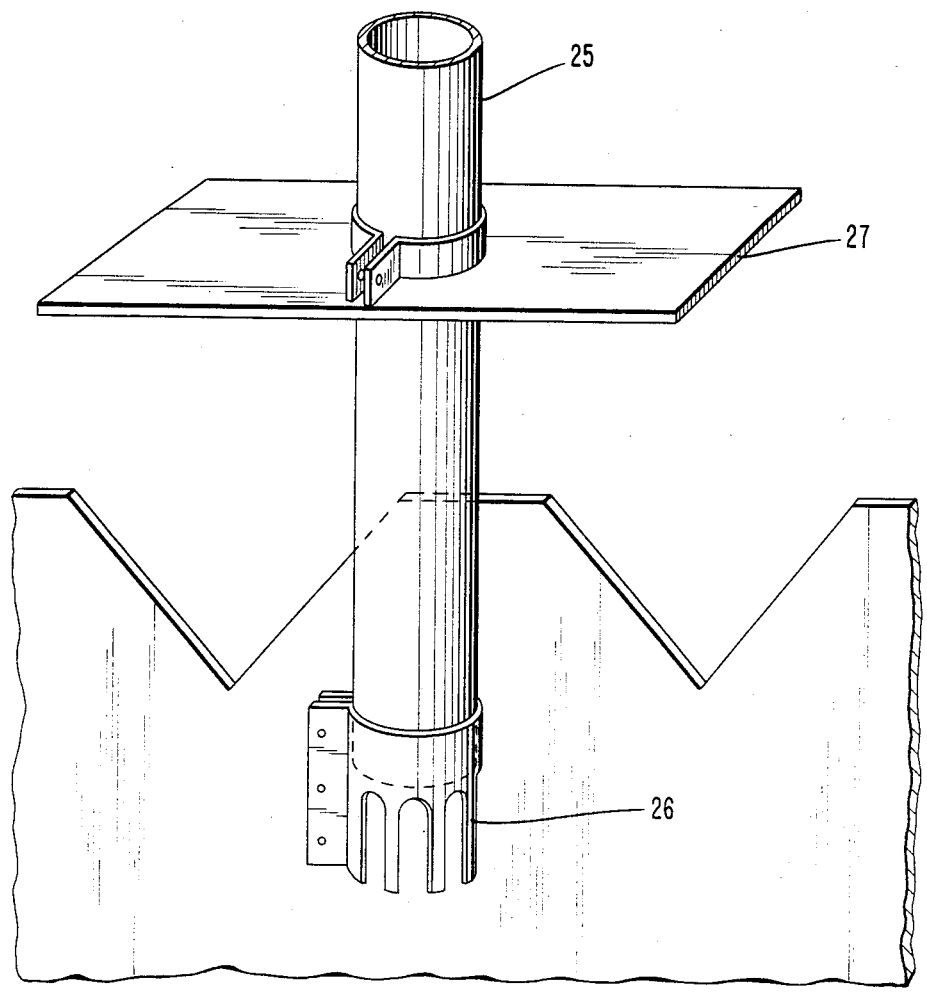
FIG. 5 is a diagrammatic view of the system for feeding the casing with the material to be distributed.

Moreover, the distribution apparatus comprises means for introducing the slurry into the feed compartment, comprising a pipe or conduit which opens into the feed compartment. As can be seen from FIG. 5, the conduit 25 is provided at its lower end with an element 26 which is in the form of a ring, being displaceable in height along the conduit 25 and rotationally thereabout, the ring being provided with projection or lug portions which are directed towards the bottom of the compartment. The spacing between the various lug portions may be variable, which, by suitably orienting the element 26, makes it possible in this case to pass a more substantial flow of substance in one direction than in another.

In accordance with the invention, the conduit 25 is also provided with a protection plate 27 disposed perpendicular thereto. The plate 27 covers the feed compartment in the vicinity of the conduit, extending over the entire width of the compartment and being contiguous with the rear wall 6 of the compartment.

In operation, the substance to be filtered is passed into the compartment 1 by means of the conduit 25, at a flow rate which may be very high. The plate 27 prevents any of the substance from being accidently projected or splashed rearwardly of the apparatus, thereby eliminating any danger of the substance causing corrosion of the adjoining parts of the casing. In addition, the baffles 14 inhibit splashing of the slurry outwardly towards the respective ends of the feed compartment, to ensure a more homogenous distribution therein.

The product then overflows from the feed compartment to the distribution compartment, by way of the wall 7. The deflectors 22 channel the flow of substance through the orifices 21, in the vicinity of which they are positioned. Upon flowing into the distribution compartment 2, the substance meets the screen 24 which causes it to undergo a change in direction, and then the bottom 12, before flowing out onto the filtering surface 8.

It will be appreciated that many variations of the illustrated embodiment can be carried out without departing from the scope of the invention. In particular, it may be possible to provide any type of baffle members, other than the angle members which are specifically described herein. For example, it would also be possible to use simple flat or bar members, perforated metal sheets, or panel-line members of a grid or lattice-like configuration. The number, positioning and arrangement of the baffle members can vary in dependence on the type and use of the apparatus. It would be possible in particular to the provide baffle members which are simply fixed to the bottom of the feed compartment.

It will be further appreciated that orifices of the overflow arrangement could be of any suitable form other than that which is described and illustrated. In addition, it would be possible to provide a plurality of screen-forming plate members in the distribution compartment.

Moreover, it is entirely possible to position the feed conduit in other than the central portion of the feed compartment, for example towards one of the sides thereof. In addition, the substance could be fed to the apparatus by means other than the above-described conduit, and it would also be possible to provide for the feed of substance in a bottom feed mode, or from below.

As has been stated above, the apparatus according to the invention can advantageously be used for the production of phosphoric acid. In that case, it can be utilized to distribute wash water, recycled filtrates and possibly attack slurry. However, the apparatus may be used in any other realm or process requiring filtration of substantial amounts of material and in combination with any type of filter, in particular of the rotary or belt type.

More generally, the apparatus according to the invention may be used whenever there is a need for a substance to be homogenously distributed over a surface.

It will be appreciated that the invention is in no way limited to the embodiment described, which are given only by way of example. In particular, the invention includes all the means constituting technical equivalents of the means described, as well as combinations thereof, if they are used within the scope of the appended claims.

What is claimed is:

1. Apparatus for distributing a slurry over a filtering surface comprising:
   a feed compartment defined by a bottom wall, a rear wall, two side walls and a front wall forming an overflow;
   means for feeding the substance to said feed compartment;
   a distribution compartment having a rear wall defined by said overflow, two side walls, a front wall, a bottom and means defining an opening permitting said substance to flow out over the filtering surface; and
   baffle members vertically fixed on at least one of the front and rear walls within said feed compartment.

2. Apparatus according to claim 1 further including means defining orifices in the wall forming the overflow means for the overflow of the slurry to be filtered, and deflectors which are fixed to the wall forming the overflow means in the vicinity of said orifices.

3. Apparatus according to claim 2 wherein said deflectors are formed by flat members extending over substantially the entire height of the wall forming the overflow means.

4. Apparatus according to claim 2 wherein said deflectors are positioned to channel the flow of said slurry through said orifices.

5. Apparatus according to claim 1 wherein the baffle members comprise angle members.

6. Apparatus according to claim 5 wherein at least one angle member is engaged with a second angle member, said angle members including means for fixing same and for adjustment in height of one with respect to the other.

7. Apparatus according to claim 1 wherein the distribution compartment is provided with a plate forming a deflecting screen which is fixed with respect to one of the front or rear walls of said distribution compartment and disposed above said opening and extends over the entire length of said distribution compartment.

8. The apparatus of claim 7 wherein said plate is inclined towards the bottom of said distribution compartment.

9. Apparatus according to claim 1 wherein means defining a spacing is provided between the lower end of at least one baffle member and the wall forming the bottom of the feed compartment.

10. Apparatus according to claim 1 wherein the baffle members are adjustable in height.

11. Apparatus according to claim 1 wherein said feed means comprise means defining a conduit which opens into the feed compartment, and a ring member that has projection portions directed towards the bottom of the feed compartment and that is adjustable in height along the conduit and rotationally about same.

12. Apparatus according to claim 11 wherein the conduit is provided with a protection plate covering the feed compartment in the vicinity of the conduit and extending over the entire width of said feed compartment.

13. Apparatus according to claim 1 wherein said baffle members are placed to provide a more even distribution of said slurry in said feed compartment.

14. Apparatus for distributing a slurry over a filtering surface comprising:
    a feed compartment defined by a bottom wall, a rear wall, two side walls and a front wall forming an overflow;
    angular baffle members comprising limb portions and vertically fixed on at least one of the front and rear walls within said feed compartment by attachment of said limb portions;
    means for feeding said slurry to said feed compartment; and
    a distribution compartment having a rear wall defined by said overflow, two side walls, a front wall, a bottom and means defining an opening permitting said slurry to flow out over the filter surface.

15. Apparatus for distributing a slurry over a filtering surface comprising:
    a feed compartment defined by a bottom wall, a rear wall, two side walls and a front wall forming an overflow;
    angular baffle members comprising limb portions and vertically fixed on at least one of the front and rear walls within said feed compartment by attachment of said limb portions;
    means for feeding the slurry to said feed compartment;
    a distribution compartment having a rear wall defined by said overflow, two side walls, a front wall, a bottom and means defining an opening permitting said slurry to flow out over the surface; and
    a solid plate forming a deflecting screen which is fixed with respect to one of the front or rear walls of said distribution compartment, being disposed above said opening permitting said slurry to flow and extending over the entire length of said distribution compartment.

* * * * *